O. W. LEE.
FUMIGATOR.
APPLICATION FILED AUG. 3, 1910.

990,826.

Patented Apr. 25, 1911.

2 SHEETS—SHEET 1.

Witnesses
Frank B. Hoffman
C. C. Hines

Inventor
Oliver W. Lee
By Victor J. Evans
Attorney

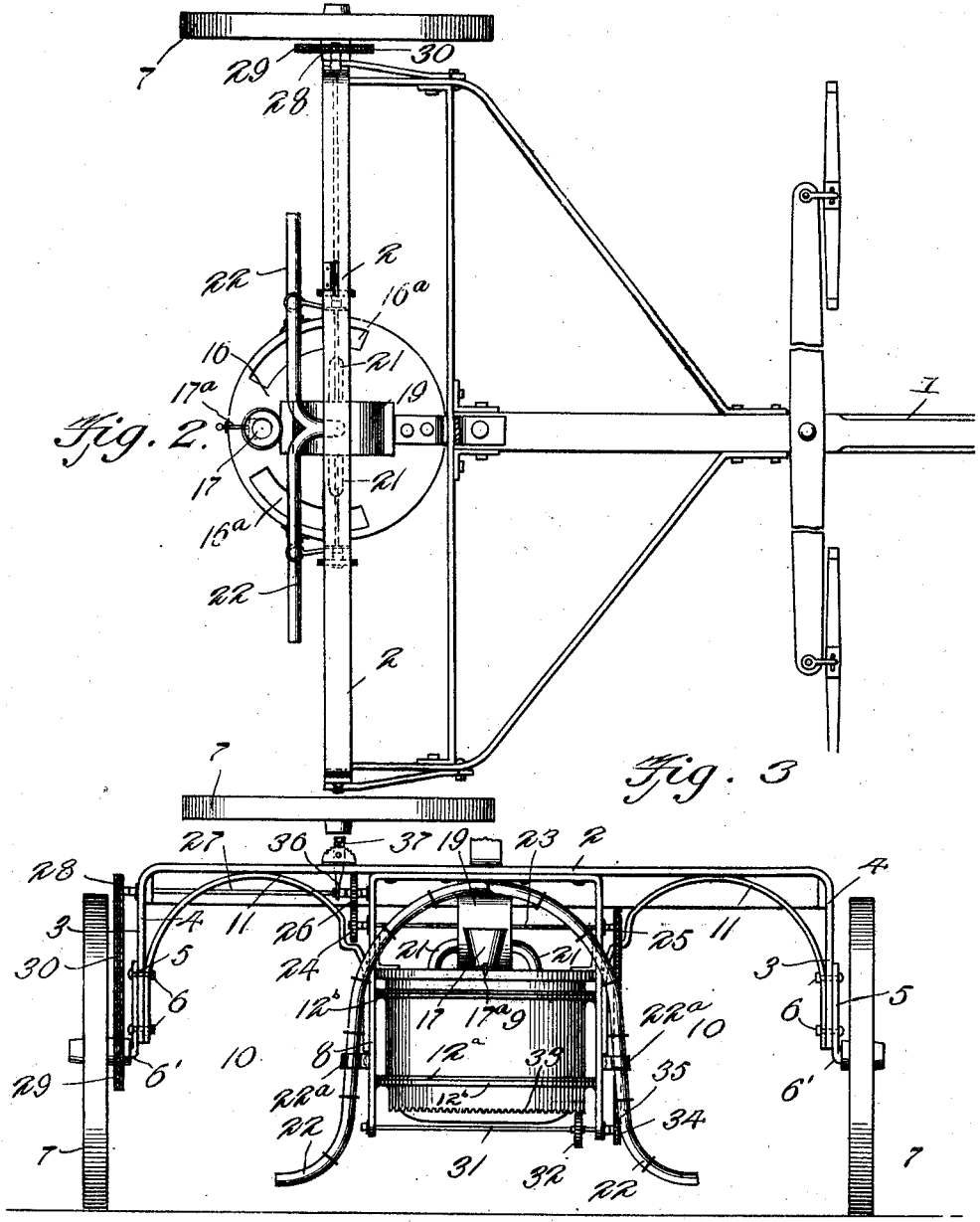

UNITED STATES PATENT OFFICE.

OLIVER W. LEE, OF MUNDAY, TEXAS.

FUMIGATOR.

990,826.

Specification of Letters Patent.    Patented Apr. 25, 1911.

Application filed August 3, 1910. Serial No. 575,264.

*To all whom it may concern:*

Be it known that I, OLIVER W. LEE, a citizen of the United States, residing at Munday, in the county of Knox and State of Texas, have invented new and useful Improvements in Fumigators, of which the following is a specification.

This invention relates to an apparatus for fumigating cotton or other growing plants for the destruction of insect life preying thereon, the object of the invention being to provide a simple, comparatively inexpensive, efficient and reliable construction of fumigator which may be conveniently drawn across a field of plants and will operate to fumigate two rows of plants at a time.

A further object of the invention is to provide a fumigator of this character in which provision is made for the effective distribution of the fumes to the plants and for the ready and convenient feed of the substance used in the generation of the fumes to the fumigator while the apparatus is in use.

The invention consists of the features of construction, combination and arrangement of parts, hereinafter fully described and claimed, reference being had to the accompanying drawings, in which:—

Figure 1:
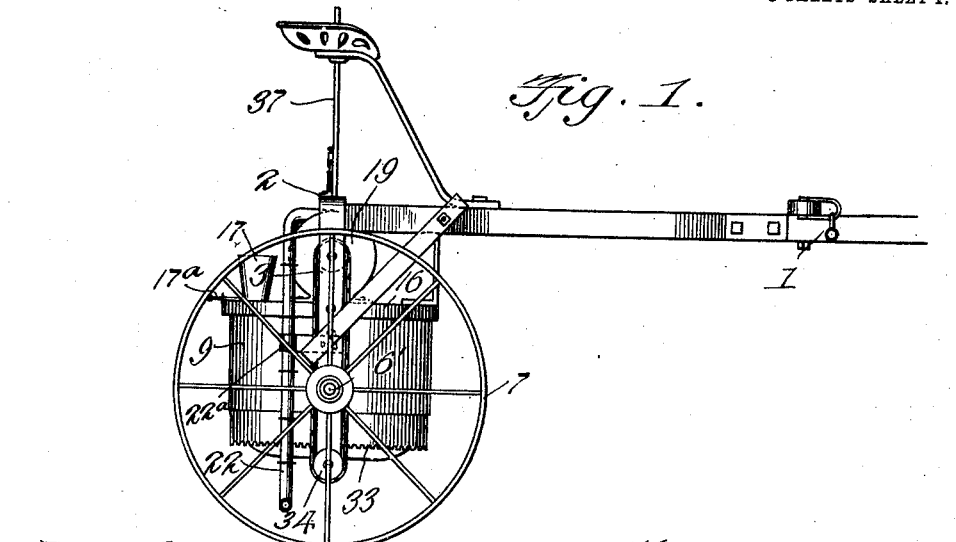
Figure 4:
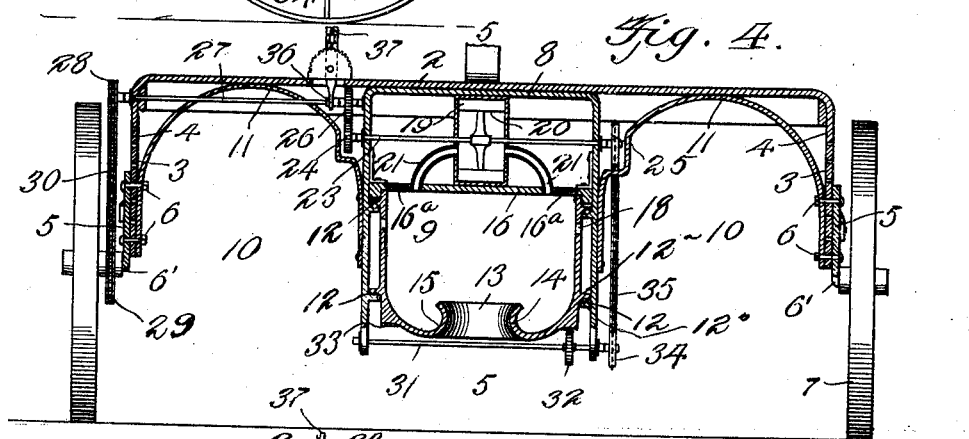
Figure 5:
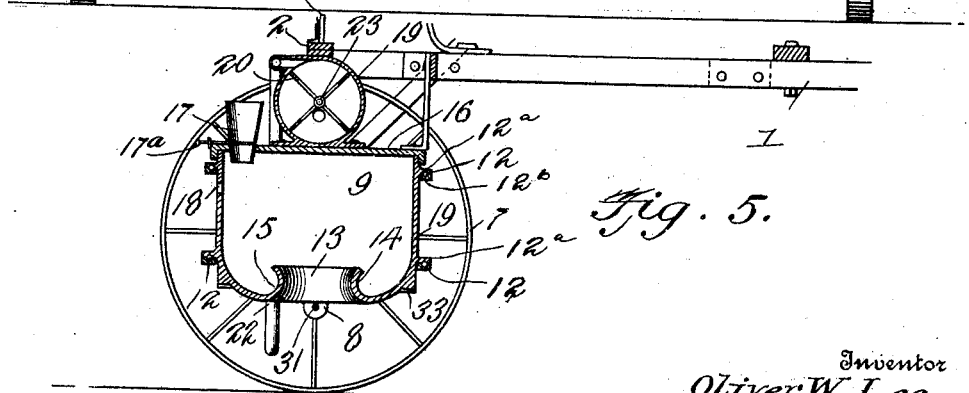

Figure 1 is a side elevation of a fumigator embodying my invention. Fig. 2 is a top plan view of the same. Fig. 3 is a rear elevation of the fumigator. Fig. 4 is a vertical transverse section of the same. Fig. 5 is a vertical section through the generator taken on a plane at right angles to the planes of sections shown in Fig. 4.

In carrying my invention into practice, I provide a wheeled frame of the arched type for straddling two rows of plants at a time, the said frame being provided with a tongue 1 and its necessary equipments for the attachment of the draft animals employed to draw the implement across the field.

The frame includes in its construction a horizontal transverse bar 2 having depending longitudinally adjustable arms 3, each of said arms consisting of an upper section 4 carried by the bar and a lower section 5 adjustably connected with said upper section by one or more bolts 6, whereby the height of the frame structure may be varied as occasion may require, to suit plants of different heights. The lower sections 5 are provided with outwardly extending spindles 6' carrying the supporting wheels 7 which are loosely journaled thereon.

A supplementary frame structure 8 depends from the bar 2 on a plane centrally between the arms 3 and carries a fume generator 9. This construction provides spaces 10 on opposite sides of the center of the frame for the reception and passage of two adjacent rows of plants, in the operation of the implement across the field, the sides of said supplemental frame being stayed and reinforced from the bar 2 and arms 3 by suitable curved braces 11. The generator 9 comprises a preferably circular pot or vessel mounted for rotary movement between the sides of the supplemental frame 8, suitable bearings 12, preferably of the antifriction type, being provided to support and permit of an easy rotary movement of said generator. These consist of balls or rollers running in raceways formed between the opposing faces of annular flanges $12^a$ extending around the generator and rings $12^b$ supported by the frame 8. The generator is provided in its bottom with an air inlet 13 formed by an upwardly extending tubular portion 14, said portion 14 being of a form and construction to provide between the same and the base portions of the walls of the generator an annular channel or trough 15 to receive the fumigating material, which is preferably of the combustible type adapted upon its ignition to generate fumes deadly to insect life.

The top of the generator is closed by a relatively stationary cover 16 supported by the supplemental frame and having a funnel-shaped inlet 17 through which the fumigating material may be introduced, the sides of the generator being provided, at any suitable point, with one or more inlets 18 coöperating with the inlet 13 to supply a sufficient amount of air to the interior of the generator to support combustion and to combine with the generative fumes to form a vapor of sufficient volume to thoroughly and completely envelop and explore all of the foliage of the plants to insure the destruction of the insects thereon. The cover is provided with transparent panels $16^a$ through which the progress of combustion of the fumigating material may be viewed, and a valve $17^a$ is employed to open or close the inlet 17 and regulate the feed of the said material to the channel 15.

Supported by the cover 16 is a casing 19 containing a rotary suction and discharge fan 20, which fan operates to draw the fumes from the generator through communicating pipes or channels 21 and to discharge the generated fumes laterally into the spaces 10 through discharge pipes or nozzles 22. The pipes or nozzles 22 are preferably curved downwardly and laterally as shown so as to discharge the fumes outwardly and laterally in the spaces 10 so that they will pass upwardly through the foliage of the plants, as will be readily understood.

The nozzles are made of rubber and metal parts and supported and held in place by spring arms 22$^a$ so that said nozzles may yield rearwardly out of the way when driven against the cotton stalks or other obstructions and upon clearing the same will automatically return to normal position.

The fan 20 is mounted on a transverse shaft 23 journaled in suitable bearings in the supplemental frame and carrying at one end a gear 24 and at its opposite end a sprocket wheel 25. The gear 24 meshes with a gear 26 on a transverse drive shaft 27 carrying a sprocket wheel 28 which is connected with a sprocket wheel 29 on one of the wheels 7 by a chain 30, whereby motion will be transmitted from said wheel to the fan. The generator is rotated in operation by gearing driven from the shaft 23, said gearing comprising a lower transverse shaft 31 carrying a gear 32 meshing with an annular rack 33 upon the generator, one end of said shaft 31 being provided with a sprocket wheel 34 connected to the shaft 23 by a chain 35. It will thus be understood that in the motion of the implement across the field the generator will be rotated to promote the thorough and equal combustion of the fumigating substance therein, while the fan will be operated simultaneously therewith to draw the generative fumes therefrom and destroy the same through the nozzles 23 into the foliage of the growing plants. If desired, a suitable clutch device 36 connected in any preferred manner with an operating handle 37 may be provided to throw the gearing into and out of operation, thus enabling the motion of the fan and generator to be arrested while the implement is being transported from place to place when not in actual use.

From the foregoing description, taken in connection with the accompanying drawings, the construction and mode of use of my improved plant fumigator will be readily understood, and it will be seen that it provides a simple and effective destructive device for the purpose. By mounting the generator so as to rotate, the combustion of the fumigating material is not only equalized and facilitated, but fresh fumigating material may be supplied to all portions of the trough or channel 15 through the inlet 17, as will be readily understood.

Having thus described my invention, I claim:—

1. A fumigator comprising a wheeled frame, a generator rotatably mounted upon the frame, fan mechanism for extracting the fumes from the generator and discharging the same for contact with the growing plants, and gearing for rotating the generator and fan.

2. A fumigator comprising a wheeled supporting frame, a generator mounted to rotate upon the frame, fan mechanism for drawing the fumes from the generator and discharging the same for contact with the growing plants, and gearing for rotating the generator and fan in unison.

3. A fumigating apparatus comprising a wheeled supporting frame, a generator mounted to rotate upon the frame, a discharge and exhaust fan in communication with the generator and provided with outlets leading therefrom, a shaft carrying the fan, a second shaft, gearing between said second shaft and the generator for rotating the latter, drive gearing between the two shafts, and means for driving the fan shaft from one of the wheels of the implement.

4. A fumigating apparatus comprising a wheeled supporting frame, a generator mounted to rotate upon the frame and having a bottom air inlet and a combustion trough surrounding the same, a relatively stationary cover for said generator, a suction and discharge fan supported by said cover and communicating therethrough with said generator, discharge nozzles leading from said fan casing, and gearing for rotating the fan and generator in unison.

5. A fumigating apparatus comprising a wheeled supporting frame, a generator mounted to rotate upon the frame and having a bottom air inlet and a surrounding combustion trough, a relatively stationary cover for the generator, a fan supported by said cover and in connection with the generator therethrough, the cover also being provided with a feed opening, discharge nozzles leading from the fan casing, a gear rack upon the generator, a drive gear meshing therewith, a shaft supporting the fan, gearing between the same and the generator driving gear, and means for driving the fan shaft from one of the wheels.

In testimony whereof I affix my signature in presence of two witnesses.

OLIVER W. LEE.

Witnesses:
W. A. CAMPBELL,
R. S. RAGSDALE.